United States Patent
Robertson et al.

(10) Patent No.: US 10,215,045 B2
(45) Date of Patent: Feb. 26, 2019

(54) RECIRCULATION SEAL FOR USE IN A GAS TURBINE ENGINE

(71) Applicant: United Technologies Corporation, Hartford, CT (US)

(72) Inventors: Thomas J. Robertson, Glastonbury, CT (US); James J. McPhail, New London, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 308 days.

(21) Appl. No.: 15/026,777

(22) PCT Filed: Sep. 19, 2014

(86) PCT No.: PCT/US2014/056552
§ 371 (c)(1),
(2) Date: Apr. 1, 2016

(87) PCT Pub. No.: WO2015/084460
PCT Pub. Date: Jun. 11, 2015

(65) Prior Publication Data
US 2016/0230580 A1    Aug. 11, 2016

Related U.S. Application Data

(60) Provisional application No. 61/885,767, filed on Oct. 2, 2013.

(51) Int. Cl.
*F02C 7/28* (2006.01)
*F01D 11/00* (2006.01)
(Continued)

(52) U.S. Cl.
CPC .............. *F01D 11/005* (2013.01); *F01D 5/02* (2013.01); *F01D 11/001* (2013.01); *F02C 7/04* (2013.01);
(Continued)

(58) Field of Classification Search
CPC ........ F01D 11/005; F01D 5/02; F01D 11/001; F02C 7/04; F02C 7/28; F16J 15/04;
(Continued)

(56) References Cited

U.S. PATENT DOCUMENTS 1,779,186 A * 10/1930 Pavlecka ................ B64D 33/08
  123/195 R
2,046,522 A *  7/1936 Martin .................... B64C 11/14
  416/245 R (Continued)

FOREIGN PATENT DOCUMENTS

EP    2028375 A2    2/2009
EP    2075436 A2    7/2009
(Continued)

OTHER PUBLICATIONS

SAE International—Aerospace Material Specification—"Silicone, Rubber General Purpose 70 Durometer"—Issued Nov. 1948; last revised Jul. 2016.*

(Continued)

*Primary Examiner* — Logan M Kraft
*Assistant Examiner* — Brian Christopher Delrue
(74) *Attorney, Agent, or Firm* — Cantor Colburn LLP

(57) ABSTRACT

A recirculation seal for use within a gas turbine engine. The recirculation seal includes a first seal base, including a first seal base axis. The recirculation seal further includes a second seal base, including a second seal base axis The recirculation seal further includes a resilient bulb member coupled to the first seal base. The resilient bulb member (Continued)

includes an exterior bulb wall and an interior bulb wall, wherein the interior bulb wall defines an interior space.

8 Claims, 3 Drawing Sheets

(51) Int. Cl.
    *F01D 5/02*     (2006.01)
    *F02C 7/04*     (2006.01)
    *F16J 15/04*     (2006.01)

(52) U.S. Cl.
    CPC ............... *F02C 7/28* (2013.01); *F16J 15/04* (2013.01); *F05D 2220/32* (2013.01); *F05D 2220/36* (2013.01); *F05D 2240/24* (2013.01); *F05D 2240/55* (2013.01)

(58) Field of Classification Search
    CPC .......... F05D 2220/32; F05D 2220/36; F05D 2240/24; F05D 2240/55; F02K 1/72; F02K 1/805
    USPC ...................................... 416/245 R
    See application file for complete search history.

(56) References Cited

U.S. PATENT DOCUMENTS

| | | | | |
|---|---|---|---|---|
| 2,401,247 A | * | 5/1946 | Hunter | B64C 11/14 219/202 |
| 2,503,451 A | * | 4/1950 | Palmatier | B64D 15/02 244/134 B |
| 2,522,083 A | * | 9/1950 | Avondoglio | B64D 29/00 244/130 |
| 2,614,638 A | * | 10/1952 | Beaupre | B64C 11/14 277/578 |
| 2,742,096 A | * | 4/1956 | Brady | B64C 11/14 416/245 R |
| 2,745,501 A | * | 5/1956 | Blanchard, Jr. | B64C 11/14 416/129 |
| 2,780,298 A | * | 2/1957 | Barish | B64C 11/14 416/245 R |
| 3,229,896 A | * | 1/1966 | Levy | F04D 25/082 310/63 |
| 5,054,282 A | * | 10/1991 | Costa | F02C 7/232 220/374 |
| 5,104,286 A | | 4/1992 | Donlan | |
| 5,123,985 A | * | 6/1992 | Evans | B29D 7/01 156/212 |
| 6,161,839 A | * | 12/2000 | Walton | F01D 17/105 277/345 |
| 6,416,280 B1 | * | 7/2002 | Forrester | B64C 11/14 416/219 R |
| 6,447,250 B1 | | 9/2002 | Corrigan et al. | |
| 6,447,255 B1 | * | 9/2002 | Bagnall | F01D 5/066 277/626 |
| 6,520,742 B1 | * | 2/2003 | Forrester | F01D 5/06 416/220 R |
| 7,530,233 B2 | | 5/2009 | Milazar | |
| 8,122,702 B2 | * | 2/2012 | Tsou | F02K 1/72 244/129.4 |
| 2002/0102160 A1 | * | 8/2002 | Breakwell | B64C 11/14 415/219.1 |
| 2004/0161339 A1 | * | 8/2004 | Breakwell | B64C 11/14 416/245 R |
| 2007/0154305 A1 | | 7/2007 | Arness | |
| 2009/0087313 A1 | | 4/2009 | Belmonte et al. | |
| 2010/0080692 A1 | | 4/2010 | Tudor et al. | |

FOREIGN PATENT DOCUMENTS

| | | | | |
|---|---|---|---|---|
| EP | 2559860 A2 | | 2/2013 | |
| GB | 2464960 A | * | 5/2010 | ............... F02K 1/72 |

OTHER PUBLICATIONS

SAE International—Aerospace Material Specification—"Silicone, Rubber General Purpose 70 Durometer"—Issued Nov. 1948; revision date Apr. 2001.*
European Search Report for Application No. EP 14 86 8665.
International Search Report for Application No. PCT/US2014/056552; dated Jun. 29, 2015.
Written Opinion for Application No. PCT/US2014/056552; dated Jun. 29, 2015.

* cited by examiner

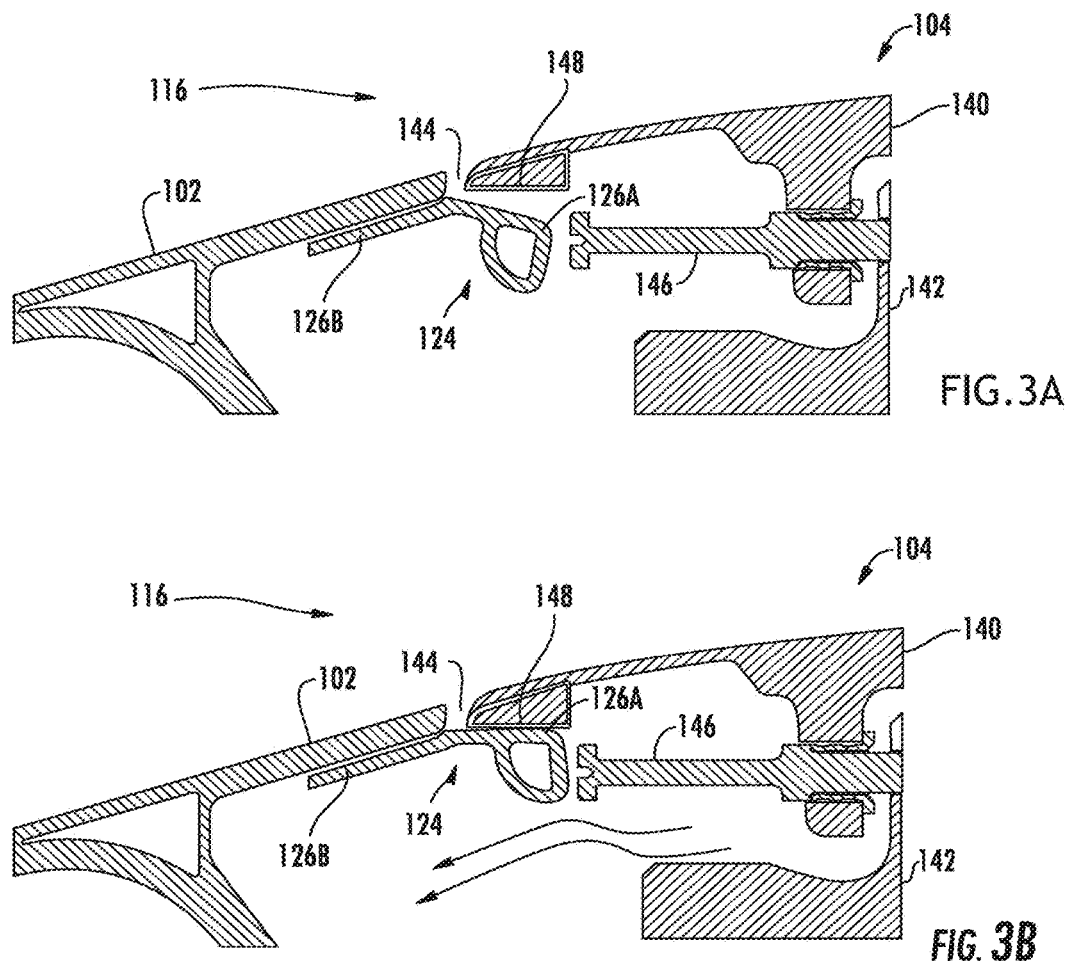

RECIRCULATION SEAL FOR USE IN A GAS TURBINE ENGINE

CROSS REFERENCE TO RELATED APPLICATION

The present application claims the priority benefit of U.S. Provisional Patent Application Ser. No. 61/885,767, filed Oct. 2, 2013. The content of this application is hereby incorporated by reference in its entirety into this disclosure.

TECHNICAL FIELD OF THE DISCLOSED EMBODIMENTS

The presently disclosed embodiments generally relate to gas turbine engines and, more particularly, to a recirculation seal for use in a gas turbine engine.

BACKGROUND OF THE DISCLOSED EMBODIMENTS

A turbofan gas turbine engine used for powering an aircraft in flight typically includes, in serial flow communication, a low pressure compressor, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan assembly and the low pressure compressor via a second rotor shaft.

The low pressure compressor has a plurality of stages, the first stage of which is generally known as the fan stage. A fan duct extends circumferentially about the low pressure compressor to bound the primary flow path. In order for the fan stage to operate efficiently in compressing the working medium gases, the gases must enter the fan stage smoothly with a minimum of perturbations. To accomplish this smooth airflow, a fan inlet spinner is attached to the fan stage to gradually turn the working medium gases into the fan stage.

Working medium gases are drawn into the engine along the primary and secondary flow paths. The gases are passed through the fan stage and the low pressure compressor where the gases are compressed to raise the temperature and the pressure of the working medium gases. The primary flow path is provided by fan platforms located between adjacent fan blades, near the rotor disk. Generally, each of the fan platforms are affixed to the rotor disk via a pin/clevis mechanism. Thus, during operation, axial retention of the pin is required.

Sealing is also desired between the fan inlet spinner and the fan platform to prevent recirculation of air from entering the primary flow path. As is known in the art, the locations of the primary flow path and the pin within a particular engine can make it difficult to provide as separate features a retention feature on the fan inlet spinner body and a recirculation seal. There is therefore a need for improvements in this area.

BRIEF SUMMARY OF THE DISCLOSED EMBODIMENTS

In one aspect, a recirculation seal used within a gas turbine engine of the present disclosure is provided. The recirculation seal includes a first seal base, including a first seal base axis. The recirculation seal further includes a second seal base, including a second seal base axis. The recirculation seal further includes a resilient bulb member coupled to the first seal base. The resilient bulb member includes an exterior bulb wall and an interior bulb wall, wherein the interior bulb wall defines an interior space. In one embodiment, an angle is formed between the first seal base axis and the second seal base axis. In one embodiment, the angle formed between the first seal base axis and the second seal base axis includes an acute angle.

In one embodiment, the recirculation seal is comprised of rubber. In one embodiment, the rubber includes an Aerospace Material Specifications (AMS) silicone rubber. In one embodiment, the rubber includes a durometer value of at least 50. In one embodiment, the recirculation seal includes a fabric reinforcement material affixed to first seal base, the second seal base and the resilient bulb. In one embodiment, the fabric reinforcement material includes a polyester material.

In one aspect, a gas turbine engine of the present disclosure is provided. The gas turbine engine includes a fan inlet spinner, at least one fan blade platform operably coupled to a fan rotor and the fan inlet spinner, and at least one recirculation seal, wherein the at least one recirculation seal is affixed to the fan inlet spinner. In one embodiment, the at least one fan blade platform is operably coupled to the fan rotor via a pin. In one embodiment, the at least one recirculation seal is affixed to the fan inlet spinner adjacent to the at least one fan blade platform. In one embodiment, the recirculation seal is affixed to the fan inlet spinner using an adhesive applied between the second seal base and the fan inlet spinner.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIGS. 3A & 3B are schematic cross-sectional diagrams depicting a recirculation seal used within a gas turbine engine in an embodiment.

Figure 1:
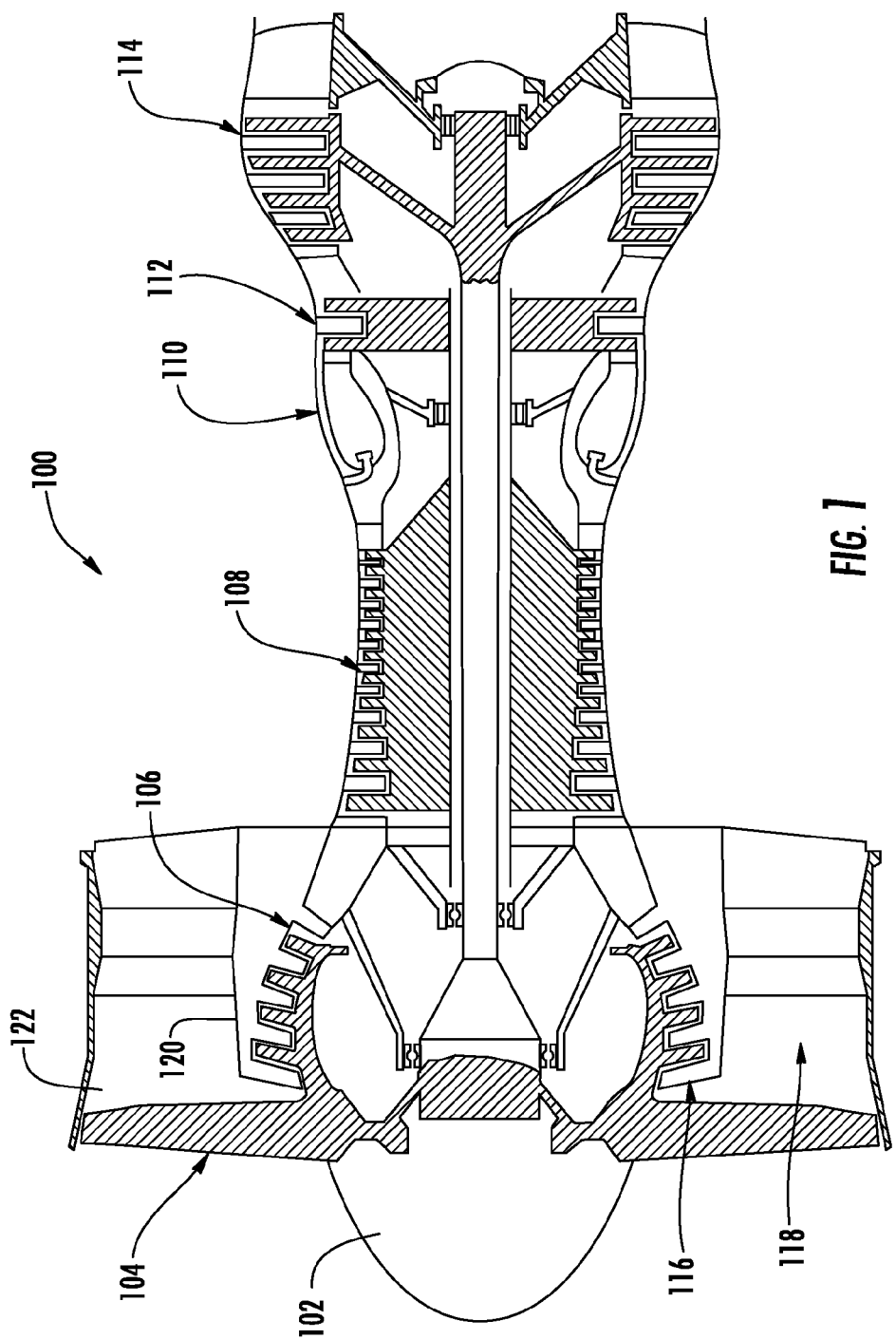
FIG. 1 is a general schematic view of a gas turbine engine as an exemplary application of the described subject matter.

An overview of the features, functions and/or configuration of the components depicted in the figures will now be presented. It should be appreciated that not all of the features of the components of the figures are necessarily described. Some of these non-discussed features, as well as discussed features are inherent from the figures. Other non-discussed features may be inherent in component geometry and/or configuration.

DETAILED DESCRIPTION OF THE DRAWINGS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a gas turbine engine 100. As shown in FIG. 1, engine 100 is depicted as a turbofan that incorporates a fan inlet spinner 102, a fan 104, a low pressure compressor 106, a high pressure compressor 108, a combustor 110, a high pressure turbine 112, and a low pressure turbine 114. The engine 100 also includes a primary flow path 116 and a secondary flow path 118.

The low pressure compressor 106 includes an inner fan case 120 and an outer fan case 122. The inner fan case 120 extends circumferentially about the primary flow path 116 to bound the flow path at its outermost portion. The secondary flow path 118 extends radially outward of the primary flow path 116 through the fan 104 and is bounded at its outermost portion by the outer fan case 122. Although depicted as a turbofan gas turbine engine 100, it should be understood that the concepts described herein are not limited to use with turbofans as the teachings may be applied to other types of gas turbine engines.

Figure 2:
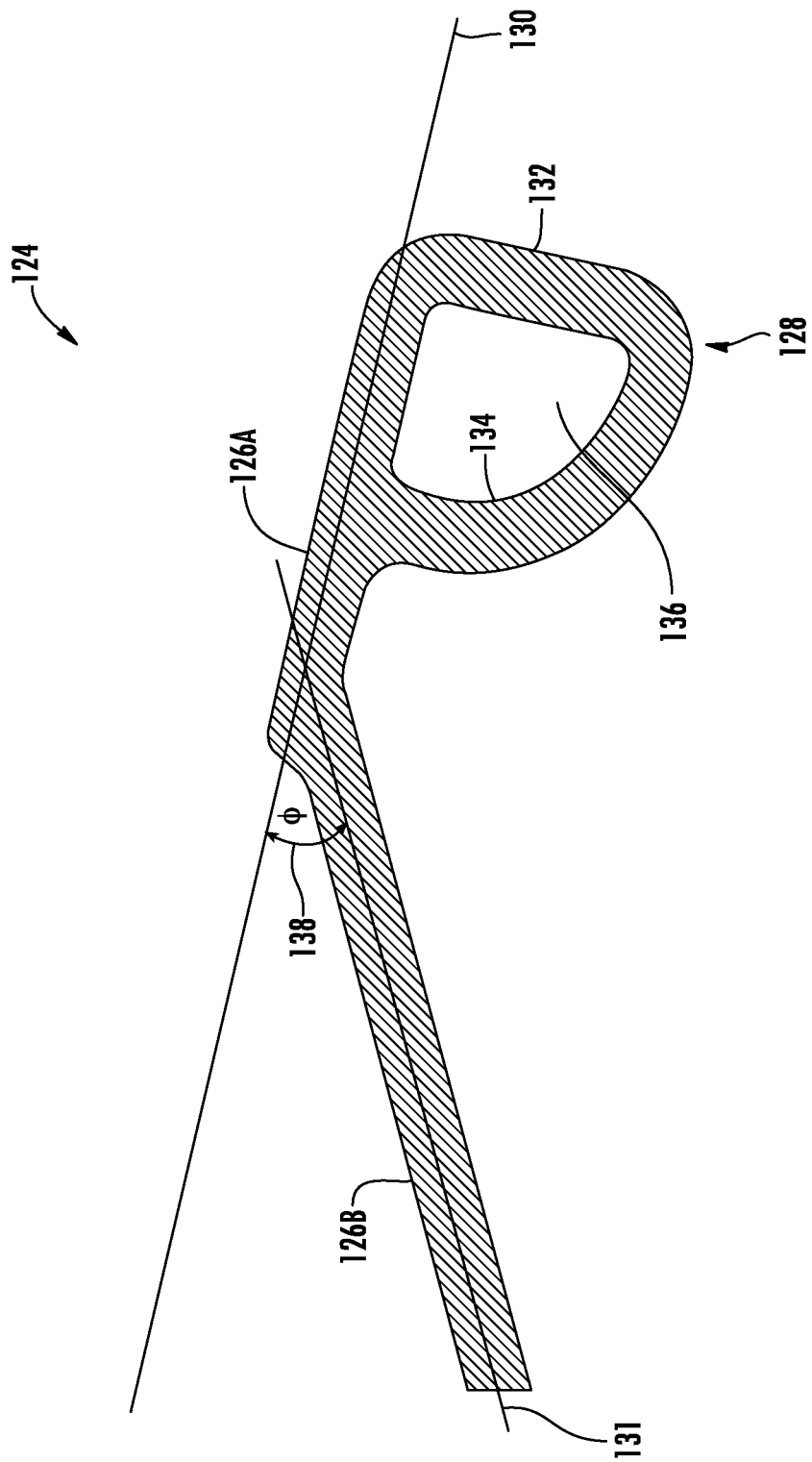
FIG. 2 is a cross-sectional view of an embodiment of a recirculation seal.

FIG. 2 is a cross-sectional diagram of an embodiment of a recirculation seal 124 for use in a gas turbine engine. The recirculation seal 124 includes a first seal base 126A and a second seal base 126B. The retention seal 124 further includes a resilient bulb member 128 coupled to the first seal base 126A. At any radial cross-section of the engine 100, the first seal base 126A defines a first seal base axis 130 and the second seal base 126B defines a second seal base axis 131. The resilient bulb member 128 includes an exterior bulb wall 132 and an interior bulb wall 134, wherein the interior bulb wall 134 defines an interior space 136. It will be appreciated that the resilient bulb member 128 may be solid.

In one embodiment, an angle 138 is formed between the first seal base axis 130 and the second seal base axis 131. In one embodiment, the angle 138 comprises an acute angle. It will be appreciated that the angle 138 formed between the first seal base axis 130 and the second seal base axis 131 may be obtuse. It will also be appreciated that the angle 138 formed between the first seal base axis 130 and the second seal base axis 131 may be substantially perpendicular. In one embodiment, the retention seal 124 is comprised of rubber. It will be appreciated that other resilient materials may be used. In one embodiment, the rubber includes an Aerospace Material Specifications (AMS) silicone rubber. In one embodiment, the rubber includes a durometer value of at least 50, to name one non-limiting example. In one embodiment, the retention seal 124 further includes a fabric reinforcement material affixed to the first and second seal bases 126A-B and the resilient bulb member 128. In one embodiment, the fabric reinforcement material includes a polyester material, to name one non-limiting example. It will be appreciated that other reinforcement materials may be used.

FIGS. 3A and 3B are enlarged cross-sectional diagrams depicting the recirculation seal 124 in use with the gas turbine engine 100. In one embodiment, at least one fan blade platform 140 is operably coupled to a fan rotor 142 and the fan inlet spinner 102. In one embodiment, the at least one fan blade platform 140 is operably coupled to the fan rotor 142 via a pin 146. Generally, a space 144 is maintained between the fan inlet spinner 102 and the at least one fan blade platform 140.

In one embodiment, at least one recirculation seal 124 is affixed to the fan inlet spinner 102 adjacent to the at least one fan blade platform 140. For example, the second seat base 126B is affixed to the aft end of the fan inlet spinner 102 in an embodiment. In one embodiment, the at least one recirculation seal 124 is affixed to the fan inlet spinner 102 using an adhesive applied between the second seal base 126B and the fan inlet spinner 102 to name one non-limiting example. It will be appreciated that the adhesive may be elastomeric or thermoset, such as epoxy to name one non-limiting example. As the fan inlet spinner 102 and the fan 104 rotate to operational speed, centripetal forces are exerted on the at least one recirculation seal 124 such that the first seal base 126A comes into contact with a platform seal landing 148 and the resilient bulb member 128 moves to a position substantially parallel with the pin 146. When the resilient bulb 128 moves to the position substantially parallel with the pin 146, the resilient bulb member 128 provides a mechanism to minimize axial movement of the pin 146; thus, reducing the likelihood of the pin 146 disengaging from the at least one fan blade platform 140.

It will be appreciated from the present disclosure that the embodiments disclosed herein provide for a recirculation seal 124 affixed to a fan inlet spinner 102 to reduce the likelihood of recirculation of air, pressurized by the fan rotation, from re-entering the flow stream forward of the fan 104 and provide axial support for the retention of pin 146. In solving the problem in this manner, the performance of the gas turbine engine 100 may be improved.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A sealing configuration for a gas turbine engine, the sealing configuration comprising:
   a fan inlet spinner;
   a fan rotor;
   at least one fan blade platform operably coupled to the fan rotor and the fan inlet spinner, and the at least one fan blade platform being coupled to the fan rotor via a pin, a space being maintained between the fan inlet spinner and the at least one fan blade platform; and
   at least one recirculation seal comprising:
   a first seal base including a first seal base axis;
   a second seal base including a second seal base axis; and
   a resilient bulb member coupled to the first seal base, wherein an angle formed between the first seal base and the second seal base comprises an acute angle;
   the at least one recirculation seal being affixed to the fan inlet spinner adjacent to the at least one fan blade platform, wherein the second seal base is affixed to an aft end of the fan inlet spinner, and
   wherein the centripetal forces are exerted on the at least one recirculation seal, the first seal base contacts a platform seal landing on the at least one fan blade platform and the resilient bulb member is substantially parallel with the pin.

2. The sealing configuration of claim 1, wherein
   the resilient bulb member further includes an exterior bulb wall and an interior bulb wall;
   wherein the interior bulb wall defines an interior space.

3. The sealing configuration of claim 1, wherein
   the first and second seal bases and the resilient bulb member are comprised of rubber.

4. The sealing configuration of claim 3, wherein
   the rubber comprises a durometer value of at least 50.

5. The sealing configuration of claim 3, further comprising a fabric reinforcement material affixed to the first and second seal bases and the resilient bulb member.

6. The sealing configuration seal of claim 5, wherein the fabric reinforcement material comprises polyester.

7. The gas turbine engine of claim 1, wherein the resilient bulb member further includes an exterior bulb wall and an interior bulb wall; and the interior bulb wall defines an interior space.

8. The sealing configuration of claim 1, wherein the second seal base is affixed to the fan inlet spinner via an adhesive.

* * * * *